March 23, 1965 T. O. McCONAHA 3,174,218
BEARING REMOVAL AND INSTALLATION DEVICE
Filed April 29, 1963

INVENTOR.
THOMAS O. McCONAHA
BY
ATTORNEY

United States Patent Office 3,174,218
Patented Mar. 23, 1965

3,174,218
BEARING REMOVAL AND INSTALLATION DEVICE
Thomas O. McConaha, 362 Pearl St., Boulder, Colo.
Filed Apr. 29, 1963, Ser. No. 276,509
3 Claims. (Cl. 29—256)

This invention relates to a bearing removal and installation device, more particularly, it relates to such a device in which a tubular member or axle press body for receiving a shaft is provided at one end with means for clamping the bearing and at the other end with adjustable pressure means for forcing the bearing from the shaft.

Devices of this type should be of simple, rugged construction, of general application and positive and efficient in operation.

Accordingly, it is a primary object of this invention to provide such a removal and installation device which is of relatively simple, low cost construction.

It is another object of this invention to provide such a device which is rugged in construction, of general application and positive and efficient in operation.

It is a further object of this invention to provide a bearing removal and installation tool of improved construction and greater convenience of operation.

It is another object of this invention to provide a bearing removal and installation device including a tubular axle press body for receiving an axle and having means at one end for clamping a bearing on the axle to the tubular body, and adjustable pressure means at the other end of the tubular body for forcing the bearing off the axle.

Additional objects of my invention will become apparent from the following description, which is given primarily for purposes of illustration, and not limitation.

Stated in general terms, the objects of this invention are attained by providing a device which includes a tubular body member, or axle-press body member, adapted for inserting therein an axle, shaft, journal, etc. Clamp means are mounted on one end of the tubular member for engaging a component such as a bearing, gear wheel, ring, or the like, mounted on the axle. On the other end of the tubular member is mounted a pressure screw means which is used to apply pressure to an axle, etc. positioned in the tubular member to urge the axle through the component, such as a bearing, for example, mounted on the axle, or similar member, either to remove the bearing from the axle or install the bearing on the axle. The words "axle" and "shaft" are used herein interchangeably to indicate the member from which a bearing is removed and to which a bearing is applied.

A more detailed description of a specific embodiment of the invention is given below with reference to the accompanying drawing wherein.

A tubular member 10, which serves as an axle press body, is provided at the right end thereof with an integral wing portion 11, adapted for locking in the jaws of a vise. A cross head 12 is attached, as by welding, across the right end of axle press body 10, as shown.

Figure 1:
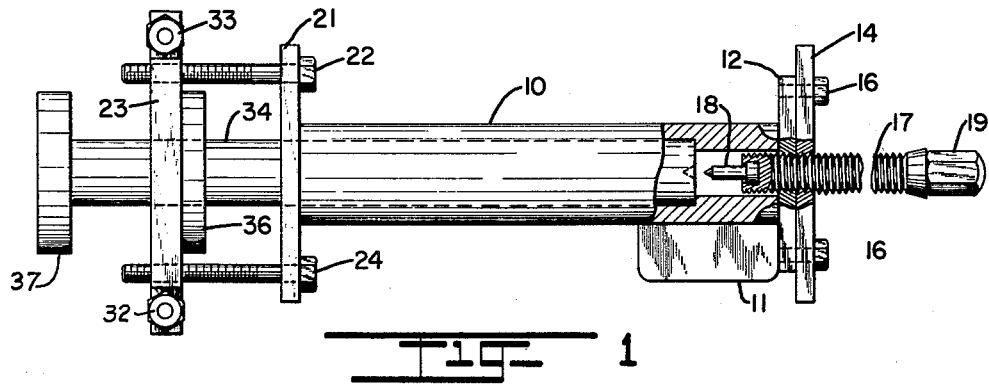
FIG. 1 is a side elevational view showing the device used for removing a bearing from an axle.

A removable pressure plate 14 is bolted to cross head 12 by bolts 16 when the device is used to remove a bearing, as shown in FIG. 1. Pressure plate 14 and cross head 12 are provided with aligned, internally threaded holes. A pressure screw 17 is threadedly engaged in the aligned internal thread formed in cross head 12 and pressure plate 14. A contact bolt 18 is rotatably mounted in a specific embodiment of the device, as shown in the inner end of pressure screw 17. It may be rotatably mounted by any suitable swivel arrangement and is used to avoid contact between the end of pressure screw 17 and the axle as such contact would result in scarring of the axle. A head 19, adapted for engagement by a wrench, is formed on the outer end of pressure screw 17.

Figure 3:
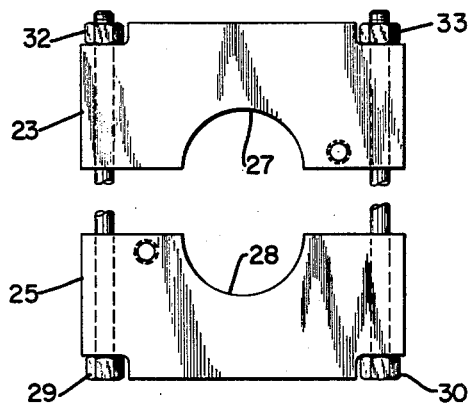
FIG. 3 is an end view showing thrust plates positioned at the left of the device shown in FIG. 1.

The left end of tubular member 10 is provided with a cross bar 21, welded to the tubular member or axle press body. An upper bolt 22 passes through a hole in cross bar 21 and is threadedly engaged in upper thrust plate 23. Similarly, a lower bolt 24 passes through cross bar 21 and threadedly engages lower thrust plate 25. Matching semicircular apertures 27 and 28 are cut through thrust plates 23 and 25, respectively, and are dimensioned to fit around an axle, as shown in FIG. 1. Elongate bolts 29 and 30 and nuts 32 and 33 are used to fasten thrust plates 23 and 25 together as shown in FIG. 3.

In using the device to remove a bearing from an axle, as shown in FIG. 1, an axle 34 is inserted into tubular member, or axle press body 10. Thrust plates 23 and 25 are mounted around axle 34 and are fastened together by bolts 29 and 30 and nuts 32 and 33. Fastened thrust plates 23 and 25 then are brought into engagement with the left side of axle-mounted bearing 36 to be removed from axle 34. This engagement is achieved by tightening bolts 22 and 24. Pressure is then applied to the end of axle 34, in contact with contact element 18, by turning a wrench on head 19 of pressure screw 17 in a clockwise direction. This action urges axle 34 through bearing 36, against the reaction of thrust plates 23 and 25 on the bearing 36, to dislodge the bearing so that it can then be removed from the axle. This is done by grasping hub 37 and drawing the axle through the bearing.

In mounting a bearing on the axle, pressure plate 14 with pressure screw 17 in place is removed from the right end of axle press body 10 and attached to cross bar 21 on the left end of axle press body 10 as described below.

Figure 2:
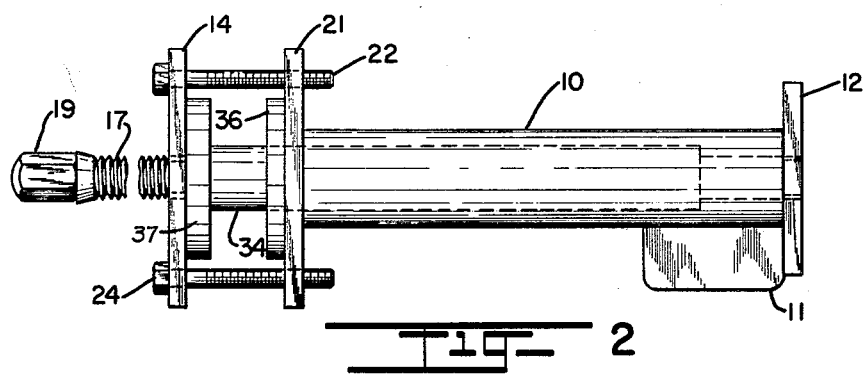
FIG. 2 is a similar view showing the device used for installing a bearing on an axle.

To mount a bearing 36 on axle 34, as shown in FIG. 2, the bearing 36 is slipped on the axle and the axle is slipped into tubular member 10 as far as it will go. Bearing 36 will then be in contact with cross bar 21. Pressure plate 14 is brought into engagement with the end of hub 37, and is tightened thereagainst by bolts 22 and 24, threaded through cross bar 21. Cross bar 21 is provided with two sets of holes, the set used in removing a bearing being unthreaded and the set used in applying a bearing being threaded to receive the threaded bolts 22 and 24. Pressure is then applied to hub 37 of axle 34 by turning a wrench on head 19 of pressure screw 17 in a clockwise direction. The resulting action urges pressure screw 17, which is threadedly engaged in pressure plate 14, against hub 37 and axle 34, which, in turn, is urged through bearing 36, against the reaction of cross bar 21, to tightly install the bearing on the axle.

It will be understood that modifications and variations of the present invention are possible in the light of the teachings given hereinabove. Also, the device described can be used to remove or install other circular components such as gears, wheels, rings, etc., relative to journals, axles, shafts, and the like. It is, therefore, to be understood that, within the scope of the appended claims, the invention can be practiced otherwise than as specifically described.

What is claimed is:

1. Bearing press apparatus for pulling bearings or applying them to a shaft comprising: an elongated tubular member for receiving the shaft; a cross bar attached to one end of said tubular member; a two piece thrust plate to fit over said shaft adjacent a bearing on said shaft when the shaft is in the tubular member, said thrust plate being adjustably connected to said cross bar; a crosshead secured to the other end of said tubular member; a pressure plate attached to said cross-head; and means adjustably secured to said pressure plate and cross-head for applying pressure to the end of said shaft in said tubular member to provide removal pressure against said bearing through said thrust plate.

2. Bearing installation apparatus for securely applying a bearing to a shaft comprising: an elongated tubular member for receiving the end of a shaft having a bearing loosely fitted thereon; a cross bar secured to said tubular member against which said bearing abuts when one end of the shaft is inserted in the tubular member; a pressure plate adapted to abut the other end of said shaft adjustably connected to said cross bar; and means adjustably attached to said pressure plate for applying pressure to the said other end of said shaft to provide installing pressure to said bearing through said cross bar.

3. Bearing press apparatus for pulling bearings or applying them to a shaft comprising: an elongated tubular member for receiving the shaft; a cross bar member attached to one end of said tubular member; a thrust plate member comprised of two mating parts to fit around said shaft adjacent a bearing on said shaft when the shaft is in the tubular member, said thrust plate member being removably secured to said cross bar; and an adjustable pressure member anchored to the other end of said tubular member and extending inside said tubular member for applying pressure to the end of said shaft in said tubular member to remove a bearing on said shaft.

References Cited by the Examiner
UNITED STATES PATENTS

| | | | |
|---|---|---|---|
| 1,596,293 | 8/26 | Neil | 29—256 |
| 1,783,649 | 12/30 | Howell | 29—263 |
| 2,352,739 | 7/44 | Sauer | 29—263 |
| 2,377,973 | 6/45 | Scott | 29—263 |

FOREIGN PATENTS 816,103   4/37   France.

WILLIAM FELDMAN, *Primary Examiner.*